(12) United States Patent
Choi

(10) Patent No.: US 7,842,181 B2
(45) Date of Patent: Nov. 30, 2010

(54) COMPOSITION AND PROCESS FOR THE REMOVAL OF SULFUR FROM MIDDLE DISTILLATE FUELS

(75) Inventor: Ki-Hyouk Choi, Dhahran (SA)

(73) Assignee: Saudi Arabian Oil Company (SA)

( * ) Notice: Subject to any disclaimer, the term of this patent is extended or adjusted under 35 U.S.C. 154(b) by 825 days.

(21) Appl. No.: 11/634,466

(22) Filed: Dec. 6, 2006

(65) Prior Publication Data

US 2008/0135454 A1    Jun. 12, 2008

(51) Int. Cl.
*C10G 29/06* (2006.01)
*C10G 29/10* (2006.01)
*C10G 29/16* (2006.01)

(52) U.S. Cl. .............. 208/248; 208/242; 208/243; 208/244; 208/246; 208/247; 208/249; 208/250

(58) Field of Classification Search ........... 208/250, 208/242, 243, 244, 246, 247, 248, 249
See application file for complete search history.

(56) References Cited

U.S. PATENT DOCUMENTS

| | | | | | |
|---|---|---|---|---|---|
| 3,842,014 | A | * | 10/1974 | Friend et al. ........... | 208/310 R |
| 4,325,926 | A | * | 4/1982 | Blanton, Jr. ............ | 502/414 |
| 4,464,252 | A | | 8/1984 | Eberly, Jr. | |
| 5,928,497 | A | * | 7/1999 | Iaccino .................. | 208/212 |
| 6,248,230 | B1 | | 6/2001 | Min et al. | |
| 6,551,501 | B1 | | 4/2003 | Whitehurst et al. | |
| 2005/0040078 | A1 | * | 2/2005 | Zinnen et al. ........... | 208/212 |
| 2005/0075528 | A1 | | 4/2005 | Burkhardt et al. | |
| 2005/0173297 | A1 | | 8/2005 | Toida | |
| 2008/0099375 | A1 | * | 5/2008 | Landau et al. .......... | 208/244 |

FOREIGN PATENT DOCUMENTS

| | | |
|---|---|---|
| EP | 1454976 A1 | 9/2004 |
| WO | 9600269 A1 | 1/1996 |

OTHER PUBLICATIONS

Arturo J. Hernandez and Ralph T. Yang, "Desulfurizaton of Transportation Fuels by Adsorption", Catalysis Reviews (2004), pp. 111-150, vol. 46, No. 2.

Y. Sano, K.H. Choi, Korai, I. Mochida, "Selection and Further Activation of Activated Carbons for Removal of Nitrogen Species in Gas Oil as a Pretreatment for Its Deep Hydrodesulfurization", Energy & Fuels (2004), pp. 644-651, vol. 18.

Y. Sano, K. Sugahara, K.H. Choi, Y. Korai, I. Mochida, "Two-step adsorption process for deep desulfurization of diesel oil", Fuel (2005), pp. 903-910, vol. 84.

Masaomi Amemiya, Yozo Korai, and Isao Mochida, "Catalyst Deactivation in Distillate Hydrotreating (Part 2) Raman Analysis of Carbon Deposited on Hydrotreating Catalyst for Vacuum Gas Oil", Journal of the Japan Petroleum Institute (2003), pp. 99-104, vol. 46, No. 2.

Edward Furimsky and Franklin E. Massoth, "Deactivation of hydroprocessing catalysts", Catalysis Today (1999), pp. 381-495, vol. 52.

Y. Sano, K. Choi, Y. Korai, I. Mochida, "Adsorptive removal of sulfur and nitrogen species from a straight run gas oil for its deep hydrodesulfurization", American Chemical Society, Fuel Chemistry Division Preprints (2003), vol. 48(1), pp. 138-139.

Y. Sano, K. Choi, Y. Korai, I. Mochida, "Adsorptive removal of sulfur and nitrogen species from a straight run gas oil over activated carbons for its deep hydrodesulfurization", Applied Catalysis B: Environmental (2004), vol. 49, pp. 219-225.

Y. Sano, K. Choi, Y. Korai, I. Mochida, "Effects of nitrogen and refractory sulfur species removal on the deep HDS of gas oil", Applied Catalysis B: Environmental (2004), vol. 53, pp. 169-174.

K. Choi, N. Kunisada, Y. Korai, I. Mochida, K. Nakano, "Facile ultra-deep desulfurization of gas oil through two-stage or -layer catalyst bed", Catalysis Today (2003), vol. 86, pp. 277-286.

K. Choi, Y. Korai, I. Mochida, J. Ryu, W. Min, "Impact of removal extent of nitrogen species in gas oil on its HDS performance: an efficient approach to its ultra deep desulfurization", Applied Catalysis B: Environmental (2004), vol. 50, pp. 9-16.

Y. Sano, K. Choi, Y. Korai, I. Mochida, "Selection and Further Activation of Activated Carbons for Removal of Nitrogen Species in Gas Oil as a Pre-Treatment for Deep Desulfurization" American Chemical Society, Fuel Chemistry Division Preprints (2003), vol. 48(2), pp. 658-659.

* cited by examiner

*Primary Examiner*—Glenn Caldarola
*Assistant Examiner*—Randy Boyer
(74) *Attorney, Agent, or Firm*—Bracewell & Giuliani LLP

(57) ABSTRACT

A composition and process for removing sulfur from middle distillate petroleum hydrocarbon fuels. The composition includes an alumina component and a carbon component. The composition is present in an amount effective to adsorb sulfur compounds from the fuel. The alumina component and the carbon component preferably collectively comprise a composite material. The composition can further include a sulfur component, preferably a metal sulfide or sulfur oxide. The composition can also further include at least one compound having a Group VI or Group VIII metal from the periodic table.

13 Claims, 1 Drawing Sheet

COMPOSITION AND PROCESS FOR THE REMOVAL OF SULFUR FROM MIDDLE DISTILLATE FUELS

TECHNICAL FIELD OF THE INVENTION

The present invention relates to a composition and process for the removal of sulfur from middle distillate fuels.

BACKGROUND OF THE INVENTION

In the petroleum industry, it is common for light gas oils, particularly middle distillate petroleum fuels, to contain sulfur species. Engines and vehicles utilizing these contaminated fuels can produce emissions of nitrogen oxide, sulfur oxide and particulate matter. Government regulations have become more stringent in recent years with regard to allowable levels of these potentially harmful emissions.

Various methods have been proposed to reduce sulfur levels in these light gas oils. However, there are disadvantages associated with these previously proposed methods. For example, hydrodesulfurization of fuel in catalytic reactors has been proposed, whereby the catalyst can remove thiophenic, benzothiophenic and dibenzothiophenic sulfur compounds from the fuel. However, effective hydrodesulfurization of petroleum fuel streams by catalyst often requires the use of two or more reactors in series under low flow rate and high temperature, pressure and hydrogen consumption conditions. These severe operating conditions are necessary to overcome strong inhibition by refractory sulfur and nitrogen compounds against hydrodesulfurization.

Various organic and inorganic adsorbents have also been proposed to effectuate adsorptive removal of sulfur compounds. Examples of previously proposed adsorbents include silica, alumina, zeolite, activated carbon, activated carbon-based fiber materials and spent hydrodesulfurization catalyst. However, the volumetric adsorption capacity for these adsorbents was often too low, and breakthrough of sulfur compounds into the fuel product was often too rapid. Also, inorganic adsorbents typically require high temperature treatment for regeneration, which is not practical for stable and continuous operation, and the adsorption regeneration cycle is too frequent, which makes efficient operation difficult. Further, these adsorbents are often expensive and susceptible to attrition. Fine particles produced due to attrition between adsorbent particles cause plugging and high pressure drop, which can shorten the run length of an adsorption process.

It would be beneficial to have a composition and process for removing sulfur compounds from middle distillate petroleum fuels that exhibits high selectivity at ambient temperature and high volumetric adsorption capacity upon thermal treatment. It would also be beneficial to have a composition and process for removing sulfur compounds from middle distillate petroleum fuels that demonstrates high attrition strength and longer adsorption bed lifespan. It would also be beneficial to have a composition and process for removing sulfur compounds from middle distillate petroleum fuels that can be regenerated using common solvent, and does not require special activation treatment prior to reuse.

SUMMARY OF THE INVENTION

The present invention advantageously provides a composition and process for removing sulfur from middle distillate petroleum hydrocarbon fuels. In an embodiment of the present invention, a composition is provided which includes an alumina component and a carbon component. The alumina component and the carbon component preferably collectively comprise a composite material. A sulfur component may also be included in the composite material. The carbon component can be a non-activated carbon. The composition is preferably present in an amount operable to adsorb sulfur compounds from the fuel. The composite material is preferably partially calcined, and can contain sulfur and carbon from 5 wt % to 50 wt % of the material. The composition is preferably partially burned at a temperature below 600° C. so that 100% of the carbon component is not burned out of the composite material during calcining. The composite material can be used to substantially reduce sulfur compounds present in a petroleum hydrocarbon fuel stream to produce a desulfurized stream having a boiling point in the range from 50° C. to 650° C., more preferably, from 200° C. to 400° C. The sulfur component in the composition is preferably a metal sulfide or sulfur oxide. The surface area of the composite material of the present invention is preferably from 100-250 m$^2$/g measured by N$_2$ adsorption. The composition can also further include at least one metal compound, preferably one or more of chromium, molybdenum, tungsten, uranium, selenium, tellurium, polonium, iron, cobalt, nickel, zinc, copper, ruthenium, phosphorus, boron, rhodium, palladium, osmium, iridium and platinum.

A process for removing sulfur from a middle distillate petroleum hydrocarbon fuel is also provided. In an embodiment of the present invention, the process includes the steps of partially calcining a composite material comprising an alumina component and a carbon component to improve the adsorbent properties of the composite material, and contacting the hydrocarbon fuel with the composite material in an adsorptive reactor. The composite material is preferably present in the reactor in an amount operable to adsorb sulfur compounds from the petroleum hydrocarbon fuel. In a preferred embodiment, the reactor contains 0.5 kg-1.5 kg of composite material per liter of reactor volume. The composite material can also contain a sulfur component in an embodiment of the invention.

BRIEF DESCRIPTION OF THE DRAWINGS

So that the manner in which the features, advantages and objects of the invention, as well as others that will become apparent, may be understood in more detail, more particular description of the invention briefly summarized above may be had by reference to the embodiment thereof that is illustrated in the appended drawing, which forms a part of this specification. It is to be noted, however, that the drawing illustrates only a preferred embodiment of the invention and is therefore not to be considered limiting of the invention's scope as it may admit to other equally effective embodiments.

DETAILED DESCRIPTION

Figure 1:
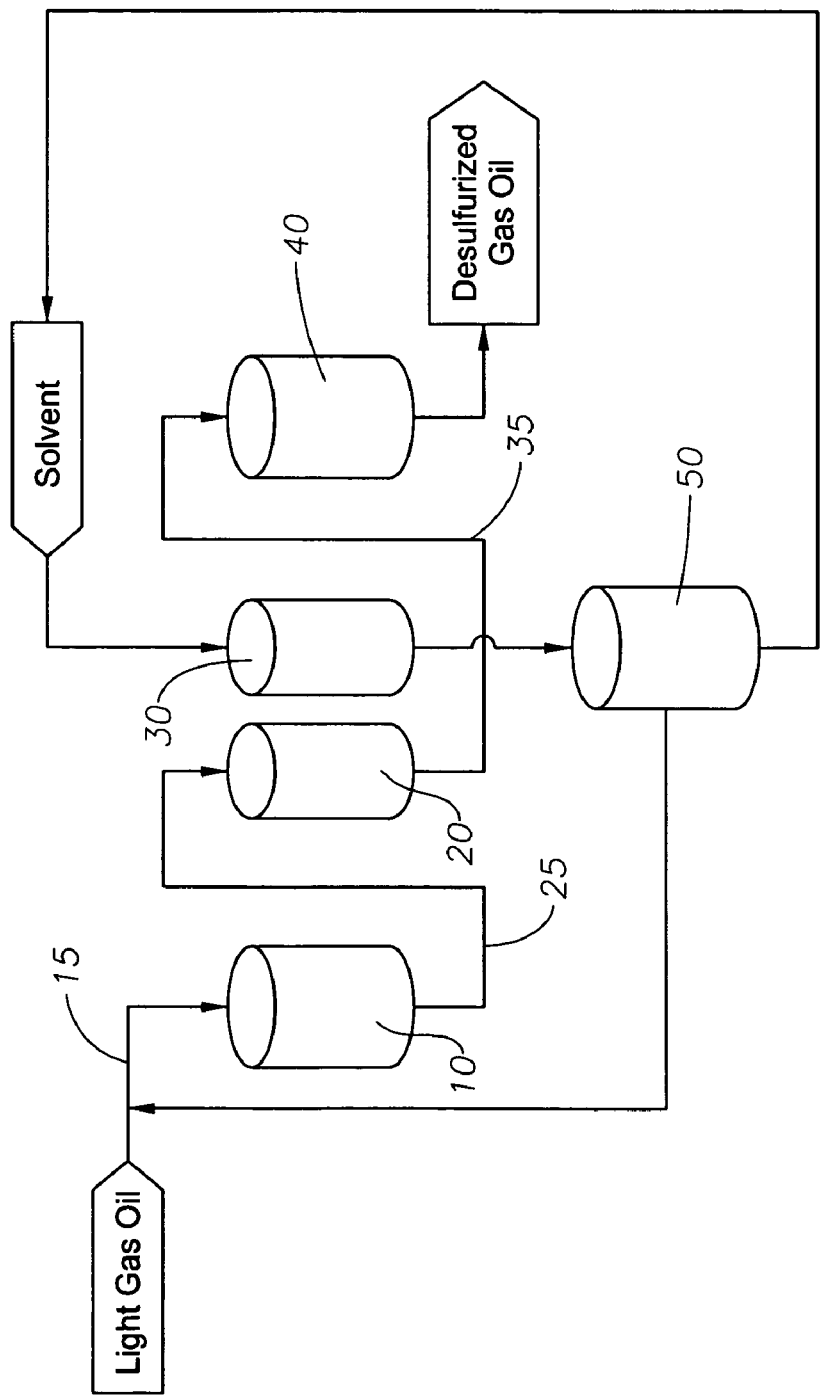
FIG. 1 is a simplified side view of a process according to an embodiment of the present invention.

The composition of the present invention preferably utilizes a carbon-alumina composite material as a base material for an adsorbent. The carbon component can be a relatively small carbon particle similar to, for example, carbon black or "coke." The carbon component can also be a non-activated carbon. The composition is operable to remove some or all of the sulfur from a middle distillate petroleum hydrocarbon fuel in an industrial adsorption process. The composition is useful in attaining longer breakthrough times in the aforementioned industrial process. The composition also has a higher volumetric adsorption capacity toward sulfur compounds included in partially hydrotreated light gas oils than the compositions containing high surface area activated carbon materials used in the prior art.

The composition of the present invention can contain sulfur and carbon from 5 wt % to 50 wt % of the adsorbent. Preferably, carbon and alumina are the two predominant materials in the composition. The composition can also contain sulfur and/or one or more Group VI or Group VIII metals of the periodic table. The sulfur is preferably present in metal sulfide or sulfur oxide form. The presence of the metallic compound and/or sulfur has been found to have beneficial effects in adsorption.

The composition can remove some or all of the sulfur from a middle distillate petroleum hydrocarbon fuel at ambient temperature. Sulfur species contained in the feedstock adsorb onto the composite material and are retained on the composite material.

The composition disclosed herein can remove sulfur from a petroleum feedstock stream having a boiling point range from 50° C. to 650° C., and preferably from 200° C. to 400° C., in an embodiment of the invention. The operating pressure depends upon the packing density of the composite material to the reactor, the flow rate of feedstock and temperature. Typically, operating pressure is less than 100 bar, preferably, 50 bar. The composition is operable across the entire hydrocarbon assay range, and can be utilized for gasoline, kerosene and diesel applications.

Calcining or similar thermal treatment of the carbon-alumina composite material is also beneficial to increase volumetric adsorption capacity. The preferred temperature for thermal treatment of the composite material is in the range from 200° C. to 800° C. in an oxygen-containing gas atmosphere. The calcining process is carried out by placing the composite material in a process heater with flowing oxygen containing gas, in particular, air at atmospheric pressure. The temperature of the heater is raised at a certain rate to a designated temperature and then held at the designated temperature for a time period, followed by cooling to room temperature. The calcination step increases the adsorption activity of the alumina-carbon composite material. The calcination step also increases the surface area of the composite material. Carbon matter on the alumina-carbon composite material is preferably already carbonized and does not require a carbonization step, which is sometimes conducted at a temperature of about 1000° C. to remove volatile matters and polymerize aromatic hydrocarbons under inert gas or oxygen containing gas conditions.

The composition of the present invention exhibits higher attrition strength than activated carbon. In contrast to brittle activated carbon, the composition disclosed herein also exhibits a longer adsorption bed life span. In general, activated carbon is prepared from hydrocarbon substances through carbonization and activation. Carbonization is conducted to remove volatile matters and polymerize aromatic hydrocarbons by thermal treatment under inert gas environments for preparing activated carbon. Carbonized matters can be activated by heat treatment under inert gas or oxygen-containing gas streams such as steam and air at around 700-1000° C. Activated carbon matter has a porous structure and a high surface area.

In contrast, the carbon component of the present invention does not require carbonization and activation processes. The adsorbent of the present invention is spent hydrotreating catalyst with carbon having low specific surface area. In general, solid carbon is deposited on the catalyst surface through adsorption of aromatic hydrocarbon and coupling or polymerization of adsorbed hydrocarbons. Solid carbon present on spent hydrotreating catalyst is similar to activated carbon and carbon black except for the very low specific surface area, which results in improved sulfur removal properties.

The composition of the present invention is particular useful in attaining low sulfur content in diesel fuels. The composition is more effective in removing sulfur compounds from light gas oil than activated carbon with high surface area. The composition can be spent catalyst that has been previously used to hydrotreat one or more petroleum streams in an embodiment of the invention. In an embodiment of the invention, the composite material is spent hydrotreating catalyst containing, for example, about 10 wt % carbon, 5 wt % sulfur, 14 wt % Mo and the remainder alumina.

FIG. 1 illustrates an adsorption process according to an embodiment of the present invention. The process utilizes two or more adsorption units including a first adsorption unit 20 and a second adsorption unit 30 operating in cyclic mode between adsorption and regenerative stages. The first and second adsorption units 20, 30 each contain a carbon-alumina composite material which adsorbs sulfur to produce a low sulfur hydrocarbon stream. One or more standby units (not shown) containing carbon-alumina composite material can also be utilized. The first and second adsorption units 20, 30 can be fixed bed type, expanded bed type, or the like. Operating temperature is in the range from 0-100° C., preferably 10-40° C., and operating pressure is in the range of 1 bar-100 bar, preferably 10-50 bar.

In an embodiment of the present invention, petroleum hydrocarbon feed is introduced into a first hydrotreating unit 10 via feed stream 15. The feed stream 15 typically contains from 1-2 wt % sulfur, although it may contain up to 3 wt % sulfur. A portion of the sulfur species contained in the feedstock is removed via a hydrodesulfurization reaction by catalyst in the presence of high pressure hydrogen. The sulfur species are converted to hydrogen sulfide by this reaction.

The petroleum hydrocarbon fuel stream exits hydrotreating unit 10 via stream 25 and is introduced into adsorption unit 20, which is in service after gaseous products and hydrogen are removed by a suitable device. The fuel stream contacts the carbon-alumina composite material in unit 20, and sulfur is preferably substantially removed from the fuel stream. Sulfur species remain on the composite material during the adsorption operation and are then removed from the composite material by solvent during the regeneration operation.

While adsorption unit 20 is in service, adsorption unit 30 is preferably undergoing regeneration. The adsorbent can be regenerated to full adsorption capacity by washing with common hydrocarbon solvent and subsequent drying at less than 100° C. in an embodiment of the invention. In a preferred embodiment, the hydrocarbon solvent is toluene or xylene. No special pre-treatment is required for activating adsorbent after regeneration. A solvent recovery unit 50 is preferably utilized to store used regenerant and separate sulfur species from the solvent. Finally, sulfur species are separated from solvent by the solvent regeneration unit 50 and fed back to hydrotreating unit 10 via line 45. Sulfur species removed from the feedstock are thiophene, alkylated thiophene, benzothiophene, alkylated benzothiophene, dibenzothiophene, and alkylated dibenzothiophene, in an embodiment of the invention.

The hydrocarbon fuel exiting adsorption unit 20 is preferably delivered to second stage hydrotreating unit 40 via stream 35. A reduced sulfur content of stream 35 facilitates hydrodesulfurization over catalyst because less hydrogen sulfide, which is a strong inhibitor for hydrodesulfurization, is evolved during hydrotreating. Additionally, removal of refractory sulfur species increases the activity of catalyst because refractory sulfur species are also strong inhibitors for hydrodesulfurization. Additionally, feedstock having lower sulfur content is hydrotreated to produce a hydrocarbon stream containing a smaller amount of sulfur. The fuel stream exiting second stage hydrotreating unit 20 preferably contains 0-10 ppm sulfur in an embodiment of the invention.

In an embodiment of the invention, a plurality of adsorption units can be utilized simultaneously in the adsorption process, whereby more than one unit can be operating in adsorption or regeneration mode at any one time. Also, the carbon-alumina composite material can preferably undergo calcining or other similar thermal treatment prior to be utilized in the adsorption units shown in FIG. 1.

The following set of examples demonstrates the effectiveness of the composition and process of the present invention in reducing the level of sulfur in a partially hydrotreated light gas oil when compared with a representative prior art process. While certain of these examples are meant to illustrate embodiments of the invention in detail, they are in no way meant to limit the scope of the invention.

Example 1

Prior Art Process 0.84 grams of activated carbon having an ash content of 0.65 wt % was dried at 110° C. for 24 hours prior to adsorption testing. Activated carbon is produced from wood, coal and other carbonaceous materials through carbonization (heating to about 1000° C. under nitrogen). Therefore, activated carbon contains some amount of minerals. The content of minerals can be measured by burn-off of activated carbon. Dried activated carbon was packed into a stainless steel tube of 50 mm length and 8 mm diameter. Partially hydrotreated light gas oil having 1,122 wt ppm sulfur was fed into the tube by an HPLC pump at the rate of 0.5 ml/min. The total sulfur content of effluent at various sampling intervals is shown in Table 1, column 2.

Example 2

Embodiment of Present Invention

Alumina-based adsorbent which had been used for hydrotreating gas oil, having 26.6 combined wt % non-activated carbon and sulfur, the carbon and alumina components being in the form of a carbon-alumina composite material, was calcined at 600° C. for two hours under air, followed by drying at 110° C. for 24 hour prior to adsorption testing. Dried adsorbent of 2.07 gram was packed into the stainless steel tube of 50 mm length and 8 mm diameter. Partially hydrotreated light gas oil having 1,122 wt ppm sulfur was fed into the tube by an HPLC pump at the rate of 0.5 ml/min. The total sulfur contents of effluent at various sampling intervals are shown in Table 1, column 3.

Example 3

Embodiment of Present Invention

Alumina-based adsorbent, which had been used for hydrotreating gas oil, having 26.6 combined wt % non-activated carbon and sulfur, the carbon and alumina being in the form of a carbon-alumina composite material, was calcined at 350° C. for two hours under air, followed by drying at 110° C. for 24 hour prior to adsorption testing. Dried adsorbent of 2.13 gram was packed into the stainless steel tube of 50 mm length and 8 mm diameter. Partially hydrotreated light gas oil having 1,122 wt ppm sulfur was fed into the tube by an HPLC pump at the rate of 0.5 ml/min. The total sulfur contents of effluent at various sampling intervals are shown in Table 1, column 4.

Example 4

Embodiment of Present Invention

Alumina-based adsorbent, which had been used for hydrotreating gas oil, having 26.6 combined wt % non-activated carbon and sulfur, the carbon and alumina being in the form of a carbon-alumina composite material, was calcined at 250° C. for two hours under air, followed by drying at 110° C. for 24 hour prior to adsorption testing. Dried adsorbent of 2.55 gram was packed into the stainless steel tube of 50 mm length and 8 mm diameter. Partially hydrotreated light gas oil having 1,122 wt ppm sulfur was fed into the tube by an HPLC pump at the rate of 0.5 ml/min. Total sulfur contents of effluent at various sampling intervals are shown in Table 1, column 5.

TABLE 1

PPM Sulfur in Partially Hydrotreated Light Gas Oils

| Sampling Time after feeding feedstock | Example 1 (wt ppm sulfur) | Example 2 (wt ppm sulfur) | Example 3 (wt ppm sulfur) | Example 4 (wt ppm sulfur) |
|---|---|---|---|---|
| 0 min-5 min | 331 | 324 | 193 | 153 |
| 5 min-10 min | 579 | 577 | 461 | 534 |
| 15 min-20 min | 778 | 617 | 624 | 666 |
| 25 min-30 min | 832 | 648 | 680 | 792 |
| 35 min-40 min | 846 | 687 | 752 | 841 |

The breakthrough pattern for sulfur components depends upon, among other factors, the type of adsorbent used and the surface properties of the adsorbent. For instance, the adsorbent in Example 2 contains a significantly smaller amount of carbon than the adsorbent in Examples 3 and 4, and so the surface properties as a whole, and the resulting breakthrough pattern, are distinguishable as a result.

In general, activated carbon has much higher adsorption capability than alumina in sulfur removal from gas oil due to its very high surface area. In contrast, carbon-alumina composite materials of the present invention showed enhanced adsorptive removal of sulfur compounds than activated carbon. The surface area of the composite material of the present invention is preferably from 100-250 $m^2/g$ measured by $N_2$ adsorption. In contrast, activated carbon from Example 1 has a specific surface area of 1,440 $m^2/g$ measured by $N_2$ adsorption. The improved performance of the composite material of the present invention as compared to that of activated carbon indicates that there is a strong synergy and beneficial mutual interaction between carbon and alumina in this particular application.

While the invention has been shown or described in only some of its forms, it should be apparent to those skilled in the art that it is not so limited, but is susceptible to various changes without departing from the scope of the invention.

What is claimed:

1. A process for removing sulfur from a middle distillate petroleum hydrocarbon fuel, the process comprising the steps of:

partially calcining a composite material comprising an alumina component, a sulfur component, and a carbon component to produce a partially calcined composite material, such that a portion of the carbon component is not burned out; and contacting the middle distillate petroleum hydrocarbon fuel with the partially calcined composite material in an adsorptive reactor, the partially calcined composite material being present in the reactor in an amount operable to adsorb sulfur compounds from the middle distillate petroleum hydrocarbon fuel.

2. The process of claim 1, further comprising the step of drying the partially calcined composite material before contacting the middle distillate petroleum hydrocarbon fuel with the composite material in the reactor.

3. The process of claim 1, wherein the carbon component is a non-activated carbon.

4. The process of claim 1, wherein the composite material is partially calcined at a temperature in the range from 250° C. to 600° C.

5. The process of claim 1, wherein the surface area of the partially calcined composite material is preferably from 100-250 m²/g.

6. The process of claim 1, wherein the step of partially calcining the composite material comprises the steps of heating the composite material to a temperature in the range of 200° C. to 800° C. in an oxygen containing atmosphere, maintaining the composite material at the designated temperature, and cooling the composite material to room temperature.

7. The process of claim 1, further comprising the step of regenerating the partially calcined composite material by washing the composite material with a hydrocarbon solvent and drying the composite material at a temperature less than 100° C.

8. The process of claim 1, wherein the carbon and sulfur components comprise between about 5 and 50% by weight of the composition.

9. The process of claim 1, wherein the carbon and sulfur components comprise greater than about 50% by weight of the composition.

10. The process of claim 1, wherein the sulfur component is selected from the group consisting of a metal sulfide and a sulfur oxide.

11. The process of claim 10, wherein the metal of the metal sulfide is selected from the group consisting of chromium, molybdenum, tungsten, uranium, selenium, tellurium, polonium, iron, cobalt, nickel, zinc, copper, ruthenium, phosphorus, rhodium, palladium, osmium, iridium and platinum.

12. The process of claim 10, wherein the metal of the metal sulfide is selected from the group consisting of molybdenum, and cobalt.

13. The process of claim 1, wherein the carbon and sulfur are present in an amount of at least 26.6% by weight.

* * * * *